(12) United States Patent
Numata et al.

(10) Patent No.: US 11,757,106 B2
(45) Date of Patent: Sep. 12, 2023

(54) POROUS BODY AND FUEL CELL INCLUDING THE SAME

(71) Applicant: SUMITOMO ELECTRIC INDUSTRIES, LTD., Osaka (JP)

(72) Inventors: Koma Numata, Osaka (JP); Masatoshi Majima, Osaka (JP); Mitsuyasu Ogawa, Osaka (JP); Kazuki Okuno, Osaka (JP); Naho Mizuhara, Osaka (JP); Ryoko Kanda, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 555 days.

(21) Appl. No.: 16/964,101

(22) PCT Filed: Dec. 24, 2019

(86) PCT No.: PCT/JP2019/050559
§ 371 (c)(1),
(2) Date: Jul. 22, 2020

(87) PCT Pub. No.: WO2021/130849
PCT Pub. Date: Jul. 1, 2021

(65) Prior Publication Data
US 2023/0099013 A1    Mar. 30, 2023

(51) Int. Cl.
*H01M 4/00*     (2006.01)
*H01M 8/0232*   (2016.01)
(Continued)

(52) U.S. Cl.
CPC ........... *H01M 8/0232* (2013.01); *C22C 19/03* (2013.01); *H01M 8/0236* (2013.01); *H01M 8/0241* (2013.01)

(58) Field of Classification Search
CPC ............. H01M 8/2425; H01M 4/9066; H01M 4/8605; H01M 4/8621; H01M 8/1246; Y02E 60/50; Y02E 70/50
See application file for complete search history.

(56) References Cited

U.S. PATENT DOCUMENTS

2014/0087206 A1   3/2014   Okuno et al.
2020/0373585 A1  11/2020   Okuno et al.

FOREIGN PATENT DOCUMENTS

| JP | H08-69799 A | 3/1996 | |
| JP | H09129245 A * | 5/1997 | ............. Y02E 60/50 |

(Continued)

OTHER PUBLICATIONS

Sato et al. Electrode Material and Fuel Cell, See the Abstract. (Year: 2006).*

(Continued)

*Primary Examiner* — Cynthia H Kelly
*Assistant Examiner* — Monique M Wills
(74) *Attorney, Agent, or Firm* — Oliff PLC

(57) ABSTRACT

A porous body includes a framework having a three-dimensional network structure, the framework having a body including crystal grains including nickel and cobalt as constituent elements, the cobalt having a proportion in mass of 0.2 or more and 0.8 or less with respect to a total mass of the nickel and the cobalt, the crystal grains having a shorter grain diameter of 2 µm or more, as determined in a first observed image obtained by observing the body of the framework in cross section at a magnification of 200 times.

15 Claims, 11 Drawing Sheets

(51) Int. Cl.
      *C22C 19/03*      (2006.01)
      *H01M 8/0236*   (2016.01)
      *H01M 8/0241*   (2016.01)

(56) References Cited

FOREIGN PATENT DOCUMENTS

| | | | |
|---|---|---|---|
| JP | H11-154517 A | | 6/1999 |
| JP | 2006318769 A | * 11/2006 | ......... H01M 4/8605 |
| JP | 2012-132083 A | | 7/2012 |
| JP | 2012-149282 A | | 8/2012 |
| JP | 2017-507452 A | | 3/2017 |
| WO | 2016/132811 A1 | | 8/2016 |
| WO | 2019/017252 A1 | | 1/2019 |
| WO | 2019/244480 A1 | | 12/2019 |

OTHER PUBLICATIONS

Nishihara et al. Cell for Solid Electrolyte Fuel Cell, See the Abstract (Year: 1997).*

* cited by examiner

POROUS BODY AND FUEL CELL INCLUDING THE SAME

TECHNICAL FIELD

The present disclosure relates to a porous body and a fuel cell including the porous body.

BACKGROUND ART

Conventionally, porous bodies such as porous metal bodies have a high porosity and hence a large surface area, and thus have been used in various applications such as battery electrodes, catalyst carriers, metal composite materials, and filters.

CITATION LIST

Patent Literature

PTL 1: Japanese Patent Laying-Open No. 11-154517
PTL 2: Japanese Patent Laying-Open No. 2012-132083
PTL 3: Japanese Patent Laying-Open No. 2012-149282

SUMMARY OF INVENTION

The porous body according to one aspect of the present disclosure includes a framework having a three-dimensional network structure, the framework having a body including crystal grains including nickel and cobalt as constituent elements, the cobalt having a proportion in mass of 0.2 or more and 0.8 or less with respect to a total mass of the nickel and the cobalt, the crystal grains having a shorter grain diameter of 2 μm or more, as determined in a first observed image obtained by observing the body of the framework in cross section at a magnification of 200 times.

A fuel cell according to one aspect of the present disclosure is a fuel cell including a current collector for an air electrode and a current collector for a hydrogen electrode, one selected from the group consisting of the current collector for the air electrode and the current collector for the hydrogen electrode including the porous body.

DETAILED DESCRIPTION

Figure 1:
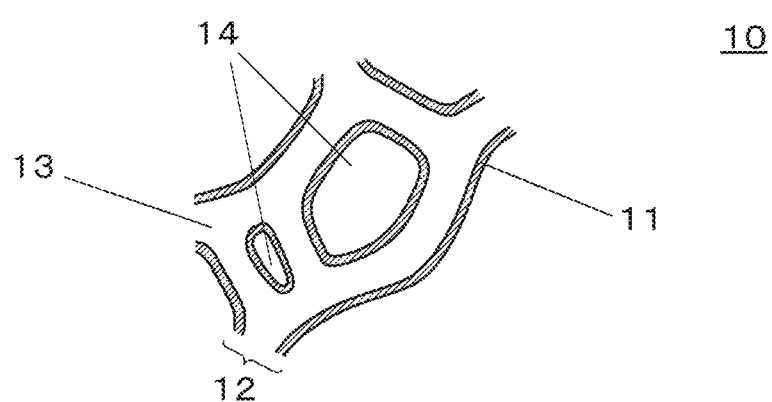
FIG. 1 is a schematic partial cross section generally showing a partial cross section of a framework of a porous body according to one embodiment of the present disclosure.

Problems to be Solved by the Present Disclosure

As a method for producing a porous metal body as described above, for example, Japanese Patent Laying-Open No. 11-154517 (PTL 1) discloses that after a treatment for imparting conductiveness to a foamed resin or the like, an electroplating layer made of metal is formed on the foamed resin, and the foamed resin is incinerated, as required, and thus removed to produce a porous metal body.

Furthermore, Japanese Patent Laying-Open No. 2012-132083 (PTL 2) discloses a porous metal body having a framework mainly composed of a nickel-tin alloy as a porous metal body having oxidation resistance and corrosion resistance as characteristics. Japanese Patent Laying-Open No. 2012-149282 (PTL 3) discloses a porous metal body having a framework mainly composed of a nickel-chromium alloy as a porous metal body having high corrosion resistance.

As described above, while various types of porous bodies such as a porous metal body are known, using this as a current collector for an electrode for a cell, a solid oxide fuel cell (SOFC) (for example, a current collector for an air electrode and a current collector for a hydrogen electrode), in particular, has room for further improvement such as adjusting the porous body in strength (for example, malleability and ductility).

The present disclosure has been made in view of the above circumstances, and contemplates a porous body having appropriate strength as a current collector for an air electrode and a current collector for a hydrogen electrode of a fuel cell, and a fuel cell including the porous body.

Advantageous Effect of the Present Disclosure

According to the above, a porous body having appropriate strength as a current collector for an air electrode and a current collector for a hydrogen electrode of a fuel cell, and a fuel cell including the porous body can be provided.

Description of Embodiments of the Present Disclosure

Initially, embodiments of the present disclosure will be enumerated and specifically described.

[1] A porous body according to one aspect of the present disclosure includes a framework having a three-dimensional network structure, the framework having a body including crystal grains including nickel and cobalt as constituent elements, the cobalt having a proportion in mass of 0.2 or more and 0.8 or less with respect to a total mass of the nickel and the cobalt, the crystal grains having a shorter grain diameter of 2 µm or more, as determined in a first observed image obtained by observing the body of the framework in cross section at a magnification of 200 times. The porous body having such a feature can have appropriate strength as a current collector for an air electrode and a current collector for a hydrogen electrode of a fuel cell.

[2] The crystal grains preferably have a longer grain diameter of 8 µm or more, as determined in the first observed image. The porous body having such a feature can have further appropriate strength as a current collector for an air electrode and a current collector for a hydrogen electrode of a fuel cell.

[3] The body of the framework preferably has a thickness of 5 µm or more and 75 µm or less. The porous body having such a feature can have further appropriate strength as a current collector for an air electrode and a current collector for a hydrogen electrode of a fuel cell.

[4] The body of the framework may further include as a constituent element at least one element selected from the group consisting of silicon, calcium, potassium, magnesium, carbon, tin, aluminum, sodium, iron, tungsten, titanium, phosphorus, boron, silver, gold, copper, zinc, chromium, molybdenum, nitrogen, sulfur, fluorine and chlorine. The porous body having such a feature can have further appropriate strength.

[5] The body of the framework preferably further includes oxygen as a constituent element. This aspect means that the porous body is oxidized as it is used. The porous body in such a state can also maintain high conductivity in a high temperature environment.

[6] The body of the framework preferably includes oxygen in an amount of 0.1% by mass or more and 35% by mass or less. In that case, the porous body can more effectively maintain high conductivity in a high temperature environment.

[7] The body of the framework preferably includes a spinel-type oxide. The porous body in this case can also more effectively maintain high conductivity in a high temperature environment.

[8] Preferably, when the body of the framework is observed in cross section at a magnification of 3,000 times to obtain a second observed image, the second observed image presents in any area 10 µm square thereof five or less voids each having a longer diameter of 1 µm or more. This allows sufficiently increased strength.

[9] The framework is preferably hollow. This allows the porous body to be lightweight and can also reduce the amount of metal required.

[10] The porous body preferably has a sheet-shaped external appearance and has a thickness of 0.2 mm or more and 2 mm or less. As a result, a current collector for an air electrode and a current collector for a hydrogen electrode that are smaller in thickness than conventional can be formed and hence the amount of metal required can be reduced and a compact fuel cell can be manufactured.

[11] A fuel cell according to one aspect of the present disclosure is a fuel cell including a current collector for an air electrode and a current collector for a hydrogen electrode, one selected from the group consisting of the current collector for the air electrode and the current collector for the hydrogen electrode including the porous body. A fuel cell having such a feature can maintain high conductivity in a high temperature environment and hence efficiently generate power.

Details of Embodiments of the Present Invention

Hereinafter, an embodiment of the present disclosure (hereinafter also referred to as "the present embodiment") will be described. It should be noted, however, that the present embodiment is not exclusive. In the present specification, an expression in the form of "A-Z" means a range's upper and lower limits (that is, A or more and Z or less). When A is not accompanied by any unit and Z is alone accompanied by a unit, A has the same unit as Z.

<<Porous Body>>

A porous body according to the present embodiment is a porous body including a framework having a three-dimensional network structure. The framework has a body including crystal grains including nickel and cobalt as constituent elements. The cobalt has a proportion in mass of 0.2 or more and 0.8 or less with respect to a total mass of the nickel and the cobalt. The crystal grains have a shorter grain diameter of 2 µm or more, as determined in a first observed image obtained by observing the body of the framework in cross section at a magnification of 200 times. The porous body having such a feature can have appropriate strength as a current collector for an air electrode and a current collector for a hydrogen electrode of a fuel cell. Herein, the "porous body" in the present embodiment for example includes a porous body made of metal, a porous body made of an oxide of metal, and a porous body including metal and an oxide of metal.

A porous body comprising a framework having a body including crystal grains including cobalt at a proportion of 0.2 or more in mass with respect to a total mass of nickel and cobalt in the crystal grains is high in strength, and even when it is deformed in stacking a SOFC, it tends to be less likely to cause cracking in the framework. When a porous body comprising a framework having a body including crystal grains including cobalt at a proportion of 0.8 or less in mass with respect to a total mass of nickel and cobalt in the crystal grains is used as a current collector for an air electrode or a current collector for a hydrogen electrode to manufacture a fuel cell, a solid electrolyte that is a constituent member of the fuel cell tends to be less likely to crack. Thus a porous body comprising a framework having a body including crystal grains including cobalt at a proportion of 0.2 or more and 0.8 or less in mass with respect to a total mass of nickel and cobalt in the crystal grains has appropriate strength as a current collector for an air electrode and a current collector for a hydrogen electrode for a fuel cell.

The porous body can have an external appearance shaped in a variety of forms, such as a sheet, a rectangular parallelepiped, a sphere, and a cylinder. Inter alia, the porous body preferably has a sheet-shaped external appearance and has a thickness of 0.2 mm or more and 2 mm or less. The porous body more preferably has a thickness of 0.5 mm or more and 1 mm or less. The porous body having a thickness of 2 mm or less can be smaller in thickness than conventional, and can thus reduce the amount of metal required and hence allows a compact fuel cell to be manufactured. The porous body having a thickness of 0.2 mm or more can have necessary strength. The thickness can be measured for example with a commercially available digital thickness gauge.

<Framework>

The porous body includes a framework having a three-dimensional network structure, as has been discussed above. The framework has a body including crystal grains including nickel and cobalt as constituent elements. The cobalt has a proportion in mass of 0.2 or more and 0.8 or less with respect to a total mass of the nickel and the cobalt.

As shown in FIG. 1, the framework has a three-dimensional network structure having a pore 14. The three-dimensional network structure will more specifically be described hereinafter. A framework 12 includes a body 11 (hereinafter also referred to as "framework body 11") and a hollow inner portion 13 surrounded by framework body 11. Framework body 11 forms a rib and a node, as will be described hereinafter. Thus, the framework is preferably hollow.

Figure 2:
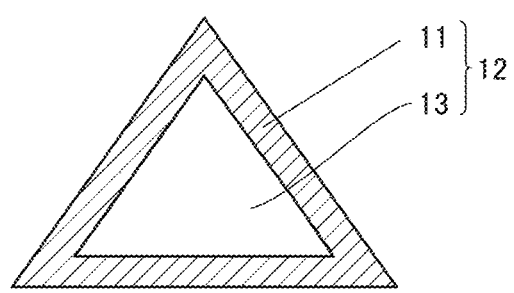
FIG. 2 schematically shows a cross section of the framework orthogonal to its longitudinal direction.

Furthermore, as shown in FIG. 2, framework 12 preferably has a triangular cross section orthogonal to its longitudinal direction. However, the cross section of framework 12 should not be limited thereto. The cross section of framework 12 may be a polygonal cross section other than a triangular cross section, such as a quadrangular or hexagonal cross section. In the present embodiment, a "triangle" is a concept including not only a geometrical triangle but also a substantially triangular shape (for example, a shape with a chamfered apex angle, a shape with a rounded apex angle, and the like). The same applies to other polygons.

That is, preferably, framework 12 is such that inner portion 13 surrounded by framework body 11 has a hollow tubular shape, and framework 12 has a triangular or other polygonal cross section orthogonal to its longitudinal direction. Since framework 12 has a tubular shape, framework body 11 has an inner wall which forms an inner surface of the tube and an outer wall which forms an outer surface of the tube. Framework 12 having framework body 11 surrounding inner portion 13 that is hollow allows the porous body to be significantly lightweight. However, the framework is not limited to being hollow and may instead be solid. Inner portion 13 that is solid allows the porous body to be enhanced in strength.

In the present embodiment when the body of the framework is observed in cross section at a magnification of 200 times to obtain a first observed image, the crystal grains have a shorter grain diameter of 2 µm or more, preferably 2 µm or more and 15 µm or less, more preferably 2 µm or more and 10 µm or less, as determined in the first observed image. Herein, the "crystal grain's shorter grain diameter" means a distance from one interface of the crystal grain to the other interface thereof in the direction of the thickness of the framework body, as will be described hereinafter. The shorter grain diameter never exceeds the thickness of the framework body.

The framework body can be observed in cross section with a field emission scanning electron microscope (FE-SEM) equipped with an electron back-scattered diffractometer (hereinafter also referred to as an "EBSD device"). Specifically, initially, a porous body to be measured is cut such that a cross section of the framework body perpendicular to the longitudinal direction of the framework body is obtained at least by one field of view. Thereafter, the obtained cross section was mechanically polished with a waterproof abrasive paper (including SiC grain abrasive as an abrasive).

Subsequently, the mechanically polished cross section is further smoothed by ion milling using Ar ions. The ion milling is performed under the following conditions:
Acceleration voltage: 6 kV
Irradiation angle: 0° from a direction of a normal to the cross section of the framework body
Irradiation time: 6 hours
Observed surface: cross-sectional worked surface Subsequently the smoothed cross-section (a mirror surface) is observed with a field emission type scanning FE-SEM (e.g., product name: "SUPRA35VP" manufactured by ZEISS) equipped with an EBSD device (e.g., trade name: "OIM 7.7.0" manufactured by AMETEK Inc.) and a thus obtained, first observed image is subjected to an EBSD analysis. The observation with the FE-SEM is conducted at magnification of 200 times.

For the EBSD analysis, data is successively collected by positioning a focused electron beam on each pixel individually. A normal to a sample surface (the smoothed cross section) is inclined by 70° with respect to the incident beam, and the analysis is conducted at 15 kV. In order to avoid a charging effect, a pressure of 10 Pa is applied. A high current mode is used in conformity with an aperture diameter of 60 µm or 120 µm. Data is collected on the cross section in a surface area of 420 µm×1250 µm (an observation area). In doing so, measurement is conducted preferably in 10 or more fields of view, more preferably 15 or more fields of view. Note, however, that in selecting the observation area, an observation area that apparently indicates an unexpected value is excluded.

A result of the EBSD analysis is analyzed using commercially available software (trade name: "Orientation Imaging Microscopy Ver 6.2", manufactured by EDAX Inc.) to create a color map for the first observed image. Specifically, initially, the crystal orientation of each crystal grain included in the smoothed cross section is determined. A color map is created based on the determined crystal orientation. In the created color map, each crystal grain's grain boundary can be determined. To create the color map, a "Crystal Direction MAP" method included in the software can be used.

Figure 3:
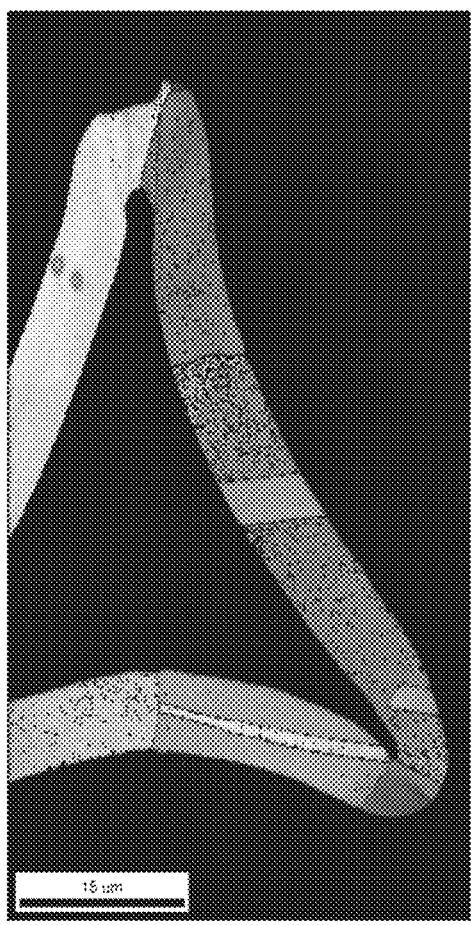
FIG. 3 is a color map created based on a cross section of the body of the framework of the present embodiment orthogonal to its longitudinal direction.
Figure 4:
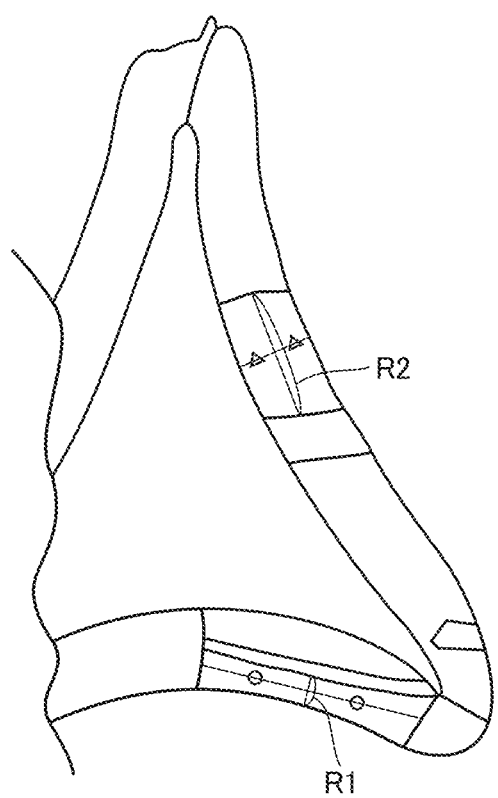
FIG. 4 is a schematic diagram showing a contour of each crystal grain included in the framework body in the color map of FIG. 3.

FIG. 3 is a color map created based on a cross section of the framework body of the present embodiment. FIG. 4 is a schematic diagram showing a contour (including a grain boundary) of each crystal grain included in the framework body in the color map of FIG. 3.

The crystal grains of the present embodiment have a shorter grain diameter, which is determined in the color map, as follows: Initially, focusing on the crystal grain of interest, a midpoint of the crystal grain in a direction perpendicular to the direction of the thickness of the framework body is determined. Subsequently, a distance between two points at which a straight line passing through the midpoint of the crystal grain and parallel to the direction of the thickness of the framework body and two interfaces of the crystal grain facing each other intersect is determined (for example, see FIG. 4, R1). With this method, at least six crystal grains' shorter grain diameters are determined per field of view and their arithmetic average value is defined as a shorter grain diameter for that field of view. By such a method, the above-described shorter grain diameter is determined for a plurality of fields of view (for example, for 10 fields of view) and such determined shorter grain diameters' arithmetic average value is defined as the "crystal grain's shorter grain diameter" in the porous body.

In the present embodiment, the crystal grains have a longer grain diameter preferably of 8 µm or more, more preferably 8 µm or more and 20 µm or less, still more preferably 8 µm or more and 15 µm or less, as determined in the first observed image. Herein, the "crystal grain's longer grain diameter" means a distance from one interface of the crystal grain to the other interface thereof in a direction perpendicular to the direction of the thickness of the framework body, as will be described hereinafter. Since the longer grain diameter is defined as described above, the longer grain diameter may be shorter than the shorter grain diameter depending on the shape of the crystal grain. The crystal grain's longer grain diameter can be obtained from the color map obtained through the above-described EBSD analysis. More specifically, initially, focusing on the crystal grain of interest, a midpoint of the crystal grain in the direction of the thickness of the framework body is determined. Subsequently, a distance between two points at which a straight line passing through the midpoint of the crystal grain and perpendicular to the direction of the thickness of the framework body and two interfaces of the crystal grain facing each other intersect is determined (for example, see FIG. 4, R2). With this method, at least six crystal grains' longer grain diameters are determined per field of view and their arithmetic average value is defined as a longer grain diameter for that field of view. By such a method, the above-described longer grain diameter is determined for a plurality of fields of view (for example, for 10 fields of view) and such determined longer grain diameters' arithmetic average value is defined as the "crystal grain's longer grain diameter" in the porous body. Note that, in the cross section of the framework body, any crystal grain in the form of a sector is excluded in calculating the longer and shorter grain diameters.

The framework preferably includes nickel and cobalt such that they have a total apparent weight of 200 g/m² or more and 1,000 g/m² or less. The apparent weight is more preferably 250 g/m² or more and 900 g/m² or less. As will be described hereinafter, the apparent weight can be appropriately adjusted for example when nickel-cobalt alloy plating is applied on a conductive resin molded body having undergone a conductiveness imparting treatment.

The total apparent weight of nickel and cobalt described above is converted into a mass per unit volume of the framework (or an apparent density of the framework), as follows: That is, the framework has an apparent density preferably of 0.14 g/cm³ or more and 0.75 g/cm³ or less, more preferably 0.18 g/cm³ or more and 0.65 g/cm³ or less. Herein, the "framework's apparent density" is defined by the following expression:

$$\text{Framework's apparent density } (g/cm^3) = M(g)/V(cm^3),$$

where M: mass of framework [g], and
V: volume of shape of external appearance of framework [cm³].

The framework has a porosity preferably of 40% or more and 98% or less, more preferably 45% or more and 98% or less, most preferably 50% or more and 98% or less. The framework having a porosity of 40% or more allows the porous body to be significantly lightweight and also have an increased surface area. The framework having a porosity of 98% or less allows the porous body to have sufficient strength.

The framework's porosity is defined by the following expression:

$$\text{Porosity } (\%) = [1 - \{M/(V \times d)\}] \times 100,$$

where M: mass of framework [g],
V: volume of shape of external appearance of framework [cm³], and
D: density of substance per se constituting framework [g/cm³].

The framework preferably has an average pore diameter of 60 µm or more and 3,500 µm or less. The framework having an average pore diameter of 60 µm or more can enhance the porous body in strength. The framework having an average pore diameter of 3,500 µm or less can enhance the porous body in bendability (or bending workability). From these viewpoints, the framework has an average pore diameter more preferably of 60 µm or more and 1,000 µm or less, most preferably 100 µm or more and 850 µm or less.

The framework's average pore diameter can be determined in the following method: That is, initially, a microscope is used to observe a surface of the framework at a magnification of 3,000 times to obtain an observed image, and at least 10 fields of view thereof are prepared. Subsequently, in each of the 10 fields of view, the number of pores is determined per 1 inch (25.4 mm=25,400 µm) of the framework. Furthermore, the numbers of pores in these 10 fields of view are averaged to obtain an average value ($n_c$) which is in turn substituted into the following expression to calculate a numerical value, which is defined as the framework's average pore diameter: Average pore diameter (µm)= 25,400 µm/$n_c$.

Herein the framework's porosity and average pore diameter can also be understood as the porous body's porosity and average pore diameter.

Preferably, when the body of the framework is observed in cross section at a magnification of 3,000 times to obtain a second observed image, the second observed image presents in any area 10 µm square thereof five or less voids each having a longer diameter of 1 µm or more. The number of voids is more preferably 3 or less. The porous body can thus sufficiently be enhanced in strength. Furthermore, it is understood that as the number of voids is 5 or less, the body of the framework is different from a formed body obtained by sintering fine powder. The lower limit of the number of voids observed is, for example, zero. Herein, the "number of voids" means an average in number of voids obtained by observing each of a plurality of (e.g., 10) "areas 10 µm square" in a cross section of the framework body.

The framework can be observed in cross section by using an electron microscope. Specifically, it is preferable to obtain the "number of voids" by observing a cross section of the framework body in 10 fields of view. The cross section of the framework body may be a cross section orthogonal to the longitudinal direction of the framework (see FIG. 2 for example) or may be a cross section parallel to the longitudinal direction of the framework (see FIG. 1 for example). In the observed image, a void can be distinguished from other parts by contrast in color (or difference in brightness). While the upper limit of the longer axis of the void should not be limited, it is for example 10,000 µm.

The framework body has a thickness preferably of 5 µm or more and 75 µm or less, more preferably 5 µm or more and 60 µm or less, still more preferably 20 µm or more and 60 µm or less. Herein, "the framework body's thickness" means a shortest distance from an inner wall, or an interface with the hollow of the inner portion, of the framework to an outer wall located on an external side of the framework. An average value of values obtained at a plurality of locations is defined as "the framework body's thickness." The framework body's thickness can be determined by observing a cross section of the framework with an electron microscope.

Specifically, the framework body's thickness can be determined in the following method: Initially, a sheet-shaped porous body is cut to expose a cross section of the framework body. One cross section cut is selected and observed with an electron microscope at a magnification of 3,000 times and thus enlarged to obtain an observed image. Subsequently, a thickness of any one side of a polygon (e.g., the triangle shown in FIG. 2) forming one framework appearing in the observed image is measured at a center of that side, and defined as the framework body's thickness. Further, such a measurement is done for 10 observed images (or in 10 fields of view thereof) to obtain the framework body's thickness at 10 points. Finally, the 10 points' average value is calculated to obtain the framework body's thickness.

(Three-Dimensional Network Structure)

The porous body includes a framework having a three-dimensional network structure. In the present embodiment, a "three-dimensional network structure" means a structure in the form of a three-dimensional network. The three-dimensional network structure is formed by a framework. Hereinafter, the three-dimensional network structure will more specifically be described.

Figure 5A:
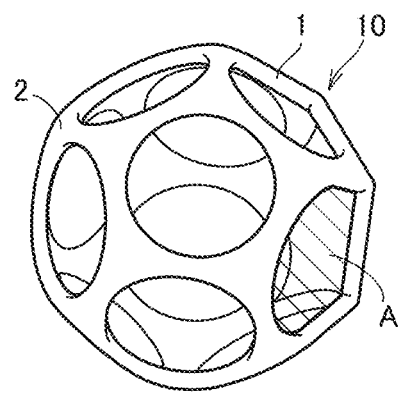
FIG. 5A is an enlarged schematic diagram focusing on one cell in the porous body in order to illustrate a three-dimensional network structure of the porous body according to one embodiment of the present disclosure.
Figure 5B:
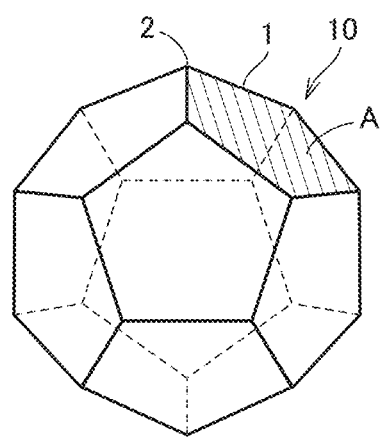
FIG. 5B is a schematic diagram showing an embodiment of the shape of the cell.
Figure 9:
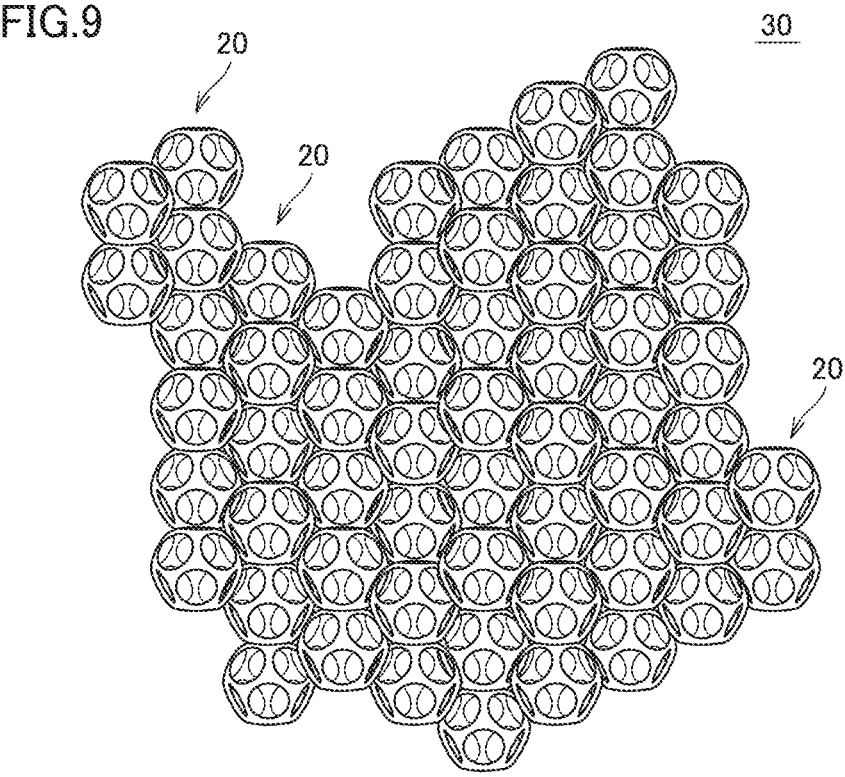
FIG. 9 is a schematic diagram showing one embodiment of a three-dimensional network structure formed by a plurality of cells joined together.

As shown in FIG. 9, a three-dimensional network structure 30 has a cell 20 as a basic unit, and is formed of a plurality of cells 20 joined together. As shown in FIGS. 5A and 5B, cell 20 includes a rib 1 and a node 2 that connects a plurality of ribs 1. Although rib 1 and node 2 are described separately in terminology for the sake of convenience, there is no clear boundary therebetween. That is, a plurality of ribs 1 and a plurality of nodes 2 are integrated together to form cell 20, and cell 20 serves as a constituent unit to form three-dimensional network structure 30. Hereinafter, in order to facilitate understanding, the cell shown in FIG. 5A will be described as the regular dodecahedron shown in FIG. 5B.

Initially, a plurality of ribs 1 and a plurality of nodes 2 are present to form a frame 10 in the form of a planar polygonal structure. While FIG. 5B shows frame 10 having a polygonal structure that is a regular pentagon, frame 10 may be a polygon other than a regular pentagon, such as a triangle, a quadrangle, or a hexagon. Herein, the structure of frame 10 can also be understood such that a plurality of ribs 1 and a plurality of nodes 2 form a planar polygonal aperture. In the present embodiment, the planar polygonal aperture has a diameter, which means a diameter of a circle circumscribing the planar polygonal aperture defined by frame 10. A plurality of frames 10 are combined together to form cell 20 that is a three-dimensional, polyhedral structure. In doing so, one rib 1 and one node 2 are shared by a plurality of frames 10.

As shown in the schematic diagram of FIG. 2 described above, rib 1 preferably has, but is not limited to, a hollow tubular shape and has a triangular cross section. Rib 1 may have a polygonal cross section other than a triangular cross section, such as a quadrangular or hexagonal cross section. Node 2 may be shaped to have a vertex to have a sharp edge, the vertex chamfered to have a planar shape, or the vertex rounded to have a curved shape.

Figure 6A:
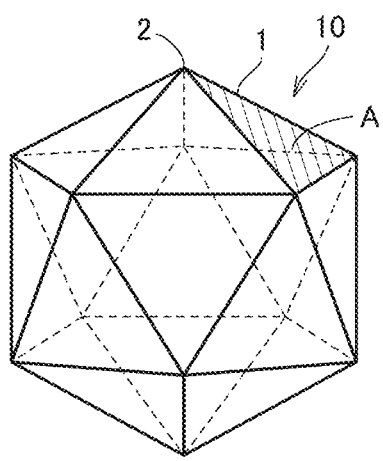
FIG. 6A is a schematic diagram showing another embodiment of the shape of the cell.
Figure 6B:
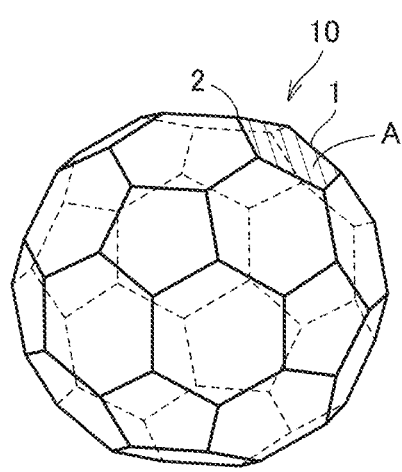
FIG. 6B is a schematic diagram showing still another embodiment of the shape of the cell.

While the polyhedral structure of cell 20 is a dodecahedron in FIG. 5B, it may be other polyhedrons such as a cube, an icosahedron (see FIG. 6A), and a truncated icosahedron (see FIG. 6B). Herein, the structure of cell 20 can also be understood as forming a three-dimensional space (i.e., pore 14) surrounded by a virtual plane A defined by each of a plurality of frame 10. In the present embodiment, it can be understood that the three-dimensional space has a pore with a diameter (hereinafter also referred to as a "pore diameter") which is a diameter of a sphere circumscribing the three-dimensional space defined by cell 20. Note, however, that in the present embodiment the porous body's average pore diameter is calculated based on the above-described calculation formula for the sake of convenience. That is, an average value of the diameters of the pores (or pore diameters) of the three-dimensional spaces defined by cells 20 is regarded as the framework's average pore diameter.

Figure 7:
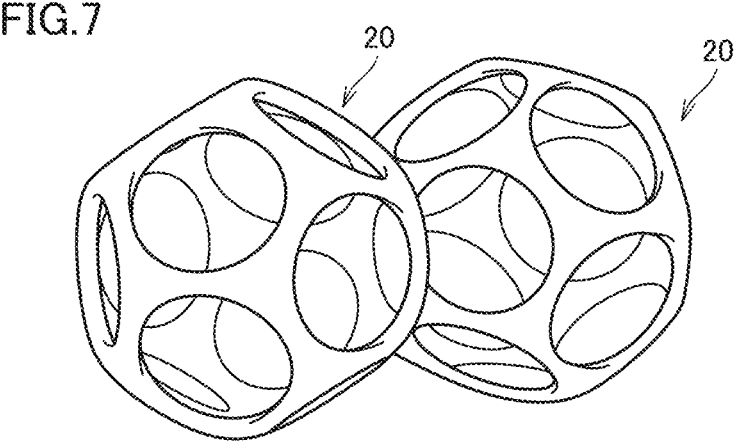
FIG. 7 is a schematic diagram showing two cells joined together.
Figure 8:
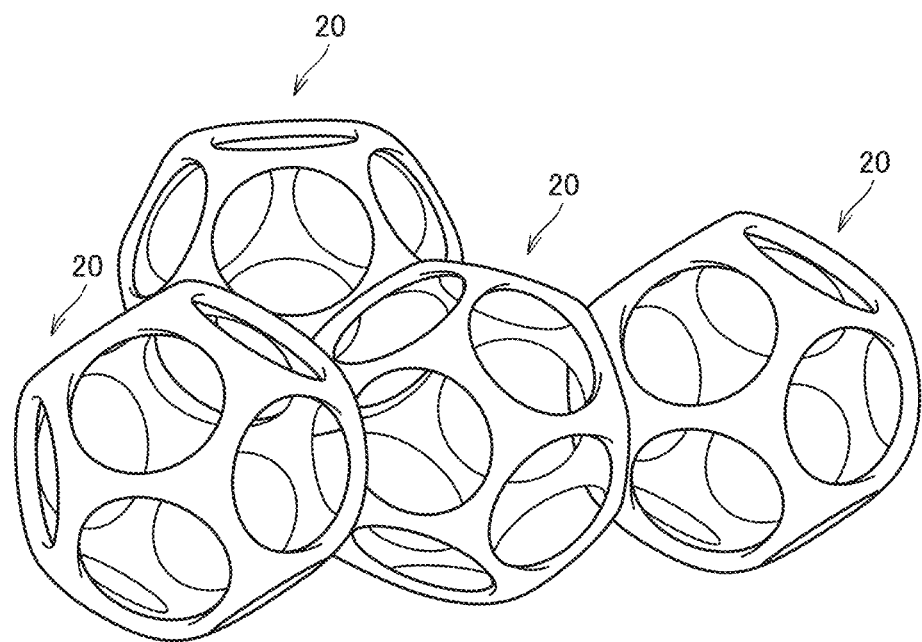
FIG. 8 is a schematic diagram showing four cells joined together.

A plurality of cells 20 are combined together to form three-dimensional network structure 30 (see FIGS. 7 to 9). In doing so, frame 10 is shared by two cells 20. Three-dimensional network structure 30 can also be understood to include frame 10 and can also be understood to include cell 20.

As has been described above, the porous body has a three-dimensional network structure that forms a planar polygonal aperture (or a frame) and a three-dimensional space (or a cell). Therefore, it can be clearly distinguished from a two-dimensional network structure only having a planar aperture (e.g., a punched metal, a mesh, etc.). Furthermore, the porous body has a plurality of ribs and a plurality of nodes integrally forming a three-dimensional network structure, and can thus be clearly distinguished from a structure such as non-woven fabric formed by intertwining fibers serving as constituent units. The porous body having such a three-dimensional network structure can have continuous pores.

In the present embodiment, the three-dimensional network structure is not limited to the above-described structure. For example, the cell may be formed of a plurality of frames each having a different size and a different planar shape.

Furthermore, the three-dimensional network structure may be formed of a plurality of cells each having a different size and a different three-dimensional shape. The three-dimensional network structure may partially include a frame without having a planar polygonal aperture therein or may partially include a cell without having a three-dimensional space therein (or a cell having a solid interior).

(Nickel and Cobalt)

The framework body includes crystal grains including nickel and cobalt as constituent elements, as has been discussed above. The crystal grains in the framework body do not exclude including a component other than nickel and cobalt unless the component affects the presently disclosed porous body's function and effect. In one aspect of the present embodiment, the framework body preferably includes crystal grains composed of the above two components (nickel and cobalt) as a metal component. Specifically, the framework body preferably includes crystal grains including a nickel-cobalt alloy composed of nickel and cobalt. The nickel-cobalt alloy is preferably a major component of the crystal grains in the framework body. Herein, a "major component" of the crystal grains means a component having the largest proportion in mass in the crystal grains. More specifically, when the crystal grains contain a component at a proportion in mass exceeding 50% by mass, the component is referred to as a major component of the crystal grains.

In one aspect of the present embodiment, the framework body may include crystal grains including nickel as a constituent element and excluding cobalt as a constituent element or crystal grains including cobalt as a constituent element and excluding nickel as a constituent element unless such affects a function and effect of the porous body of the present disclosure The crystal grains contain nickel and cobalt at a proportion in mass preferably of 80% by mass or more, more preferably 90% by mass or more, still more preferably 95% by mass or more in total relative to the mass of all of the crystal grains for example before the porous body is used as a current collector for an air electrode or a hydrogen electrode of an SOFC, that is, before the porous body is exposed to a high temperature of 700° C. or higher. The proportion in mass of nickel and cobalt in total may have an upper limit of less than 100% by mass, 99% by mass or less, or 95% by mass or less with respect to the mass of all of the crystal grains.

When the crystal grains contain nickel and cobalt at a higher proportion in total, and the porous body is used as a current collector for an air electrode or a hydrogen electrode of an SOFC or the like, a proportion of a generated oxide being a spinel-type oxide composed of at least one of nickel and cobalt, and oxygen, tend to increase. Thus, the porous body can maintain high conductivity even when used in a high temperature environment.

(Proportion in Mass of Cobalt to Total Mass of Nickel and Cobalt)

The cobalt has a proportion in mass of 0.2 or more and 0.8 or less with respect to the total mass of the nickel and the cobalt. When a porous body including a framework having such a composition is used as a current collector for an air electrode or a hydrogen electrode of an SOFC or the like, a spinel-type oxide represented by a chemical formula of $Ni_{3-x}Co_xO_4$, where $0.6 \leq x \leq 2.4$, typically $NiCo_2O_4$ or $Ni_2CoO_4$, is generated in the framework by oxidation. As the framework body is oxidized, a spinel-type oxide represented by the chemical formula of $CoCo_2O_4$ may also be generated. The spinel-type oxide exhibits high conductivity, and the porous body can hence maintain high conductivity even when the framework body is entirely oxidized as the porous body is used in a high temperature environment.

The cobalt preferably has a proportion in mass of 0.2 or more and 0.45 or less or 0.6 or more and 0.8 or less, more preferably 0.2 or more and 0.45 or less, still more preferably 0.25 or more and 0.4 or less with respect to the total mass of the nickel and the cobalt. The porous body comprising a framework having a body including cobalt at a proportion of 0.6 or more and 0.8 or less in mass with respect to the total mass of nickel and cobalt is higher in strength, and even when it is deformed in stacking a SOFC, it tends to be further less likely to cause cracking in the framework. When the porous body comprising a framework having a body including cobalt at a proportion of 0.2 or more and 0.45 or less in mass with respect to the total mass of nickel and cobalt is used as a current collector for an air electrode or a current collector for a hydrogen electrode to manufacture a fuel cell, a solid electrolyte that is a constituent member of the fuel cell tends to be less likely to crack.

(Oxygen)

The body of the framework preferably further includes oxygen as a constituent element. Specifically, the body of the framework more preferably includes oxygen in an amount of 0.1% by mass or more and 35% by mass or less. In one aspect of the present embodiment, the body of the framework more preferably further includes oxygen as a constituent element in the crystal grains. The framework body may include oxygen for example in a state before the porous body is used as a current collector for an air electrode or a hydrogen electrode of an SOFC. In one aspect of the present embodiment, the oxygen in the framework body can be detected, for example, after the porous body is used as a current collector for an air electrode or a hydrogen electrode of an SOFC. That is, preferably, after the porous body is exposed to a temperature of 700° C. or higher, the body of the framework includes oxygen in an amount of 0.1% by mass or more and 35% by mass or less. More preferably, the body of the framework includes oxygen in an amount of 10% by mass or more and 30% by mass or less, still more preferably 25% by mass or more and 28% by mass or less.

When the body of the framework includes oxygen as a constituent element in an amount of 0.1% by mass or more and 35% by mass or less, a thermal history that the porous body has been exposed to a high temperature of 700° C. or higher can be inferred. Furthermore, when the porous body is used as a current collector for an air electrode or a hydrogen electrode of an SOFC or the like and thus exposed to a high temperature of 700° C. or higher, and a spinel-type oxide composed of at least one of nickel and cobalt, and oxygen is generated in the framework, the body of the framework tends to include oxygen as a constituent element in an amount of 0.1% by mass or more and 35% by mass or less.

That is, the body of the framework preferably includes a spinel-type oxide. In one aspect of the present embodiment, the body of the framework more preferably includes a spinel-type oxide in the crystal grains. Thus, the porous body can maintain high conductivity more effectively even when it is oxidized. When the body of the framework contains oxygen at a proportion in mass departing the above range, the porous body tends to fail to obtain as desired an ability to maintain high conductivity more effectively when it is oxidized.

(Third Component)

The body of the framework can include a third component as a constituent element insofar as it does not affect a function and effect that the presently disclosed porous body has. The body of the framework may further include as a third component at least one element selected from the group consisting of silicon, calcium, potassium, magnesium, carbon, tin, aluminum, sodium, iron, tungsten, titanium, phosphorus, boron, silver, gold, copper, zinc, chromium, molybdenum, nitrogen, sulfur, fluorine and chlorine. In one aspect of the present embodiment, the body of the framework may further include at least one element that is listed as the third component in the crystal grains as a constituent element. These components may be included, for example, as unavoidable impurities that are unavoidably introduced in a manufacturing method described hereinafter. For example, examples of unavoidable impurities include elements included in a conductive coating layer formed by a conductiveness imparting treatment described hereinafter. When the framework body includes one type of third component the former preferably includes the latter in an amount of 5% by mass or less, and when the framework body includes two or more types of third components, the former preferably includes the latter in an amount of 10% by mass or less. Each third component's proportion in mass can be determined using an EDX device (energy dispersive X-ray analyzer) described hereinafter.

In one aspect of the present embodiment, the body of the framework may further include at least one non-metallic element selected from the group consisting of nitrogen, sulfur, fluorine, and chlorine as a constituent element. In one aspect of the present embodiment, the body of the framework may further include the non-metallic element as a constituent element in the crystal grains. The non-metallic element may have a proportion in mass of 5 ppm or more and 10000 ppm or less in total with respect to the mass of the body of the framework. Preferably, the non-metallic element has a proportion in mass of 10 ppm or more and 8000 ppm or less in total with respect to the mass of the body of the framework.

Further, the body of the framework may further include phosphorus as a constituent element. In one aspect of the present embodiment, the body of the framework may further include phosphorus as a constituent element in the crystal grains. The phosphorus may have a proportion in mass of 5 ppm or more and 50000 ppm or less with respect to the mass of the body of the framework. Preferably, the phosphorus has a proportion in mass of 10 ppm or more and 40000 ppm or less with respect to the mass of the body of the framework.

In another aspect of the present embodiment, the body of the framework may further include at least two non-metallic elements selected from the group consisting of nitrogen, sulfur, fluorine, chlorine, and phosphorus as constituent elements. In one aspect of the present embodiment, the body of the framework may further include the above at least two non-metallic elements in the crystal grains as constituent elements. The non-metallic elements may have a proportion in mass of 5 ppm or more and 50000 ppm or less in total with respect to the mass of the body of the framework. Preferably, the non-metallic elements have a proportion in mass of 10 ppm or more and 10000 ppm or less in total with respect to the mass of the body of the framework.

When the porous body is used as a current collector for an air electrode or a hydrogen electrode of a SOFC, it is exposed to a high environmental temperature of temperature of 700° C. or higher, as has been set forth above. However, the body of the framework includes the above-described non-metallic element as a constituent element, and the porous body can maintain appropriate strength.

(Method for Measuring Proportion in Mass of Each Element)

The proportion in mass of each element in the body of the framework (in % by mass) can be determined as follows: an image of a cross section of the framework cut, as observed through a scanning electron microscope (SEM), can be analyzed with an EDX device accompanying the SEM (for example, an SEM part: trade name "SUPRA35VP" manufactured by Carl Zeiss Microscopy Co., Ltd., and an EDX part: trade name "octane super" manufactured by AMETEK, Inc.) to determine the proportion in mass of each element in the body of the framework. The EDX device can also be used to determine the outer shell's nickel and cobalt contents. The EDX device can also be used to determine a proportion in mass of nickel and cobalt in the crystal grains of the framework body. Specifically, based on the atomic concentration of each element detected by the EDX device, a percentage, ratio and the like in mass of nickel and cobalt in the crystal grains of the framework body can be determined. When the body of the framework includes oxygen, the mass % of the oxygen in the body of the framework can also be determined in the same manner. Further, whether the body of the framework has a spinel-type oxide composed of at least one of nickel and cobalt, and oxygen can be determined by exposing the cross section to an X-ray and analyzing its diffraction pattern, i.e., by X-ray diffractometry (XRD).

For example, whether the body of the framework has a spinel-type oxide can be determined using a measurement device such as an X-ray diffractometer (for example, trade name (model number): "Empyrean" manufactured by Spectris, and analysis software: "integrated X-ray powder diffraction software PDXL"). The measurement may be done for example under the following conditions:

(Measurement Conditions)
X-ray diffractometry: θ-2θ method
measuring system: collimated beam optical mirror
scan range (2θ): 10-90°
cumulative time: 1 second/step
step: 0.03°.

<<Fuel Cell>>

A fuel cell according to the present embodiment is a fuel cell including a current collector for an air electrode and a current collector for a hydrogen electrode. At least one selected from the group consisting of the current collector for the air electrode and the current collector for the hydrogen electrode includes the porous body. The current collector for the air electrode or the current collector for the hydrogen electrode includes a porous body having appropriate strength as a current collector for a fuel cell, as described above. The current collector for the air electrode or the current collector for the hydrogen electrode is thus suitable as a current collector for an air electrode of an SOFC or a current collector for a hydrogen electrode of an SOFC. For the fuel cell, it is more suitable to use the porous body as the current collector for the air electrode as the porous body includes crystal grains including nickel and cobalt.

Figure 10:
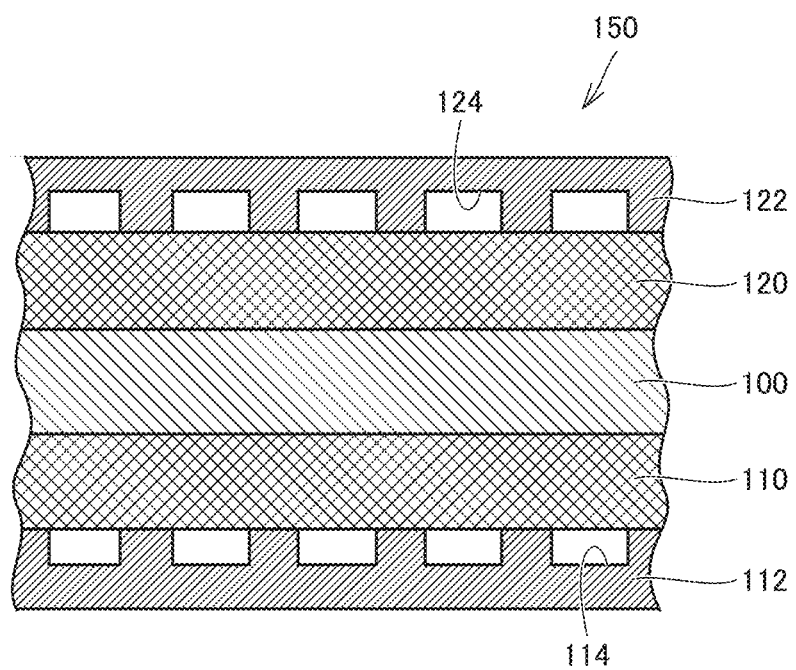
FIG. 10 is a schematic cross section of a fuel cell according to an embodiment of the present disclosure.

FIG. 10 is a schematic cross section of a fuel cell according to an embodiment of the present disclosure. A fuel cell 150 includes a current collector 110 for a hydrogen electrode, a current collector 120 for an air electrode, and a cell 100 for a fuel cell. Cell 100 for the fuel cell is provided between current collector 110 for the hydrogen electrode and current collector 120 for the air electrode. Herein a "current collector for a hydrogen electrode" means a current collector on a side in a fuel cell that supplies hydrogen. A "current collector for an air electrode" means a current collector on a side in the fuel cell that supplies a gas (e.g., air) containing oxygen.

Figure 11:
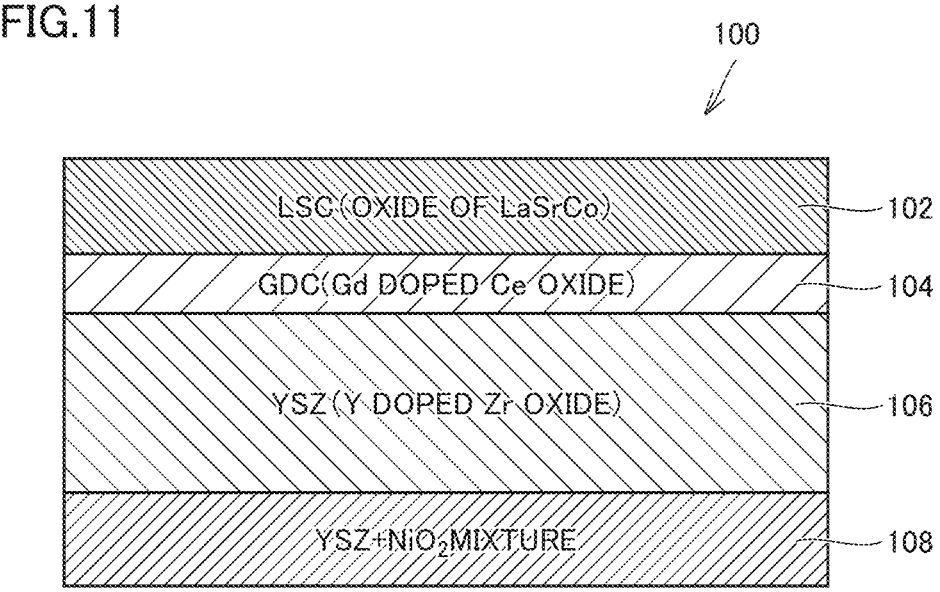
FIG. 11 is a schematic cross section of a cell for a fuel cell according to an embodiment of the present disclosure.

FIG. 11 is a schematic cross section of a cell for a fuel cell according to an embodiment of the present disclosure. Cell 100 for the fuel cell includes an air electrode 102, a hydrogen electrode 108, an electrolyte layer 106 provided between air electrode 102 and hydrogen electrode 108, and an intermediate layer 104 provided between electrolyte layer 106 and air electrode 102 to prevent a reaction therebetween. As the air electrode, for example, an oxide of LaSrCo (LSC) is used. As the electrolyte layer, for example, an oxide of Zr doped with Y (YSZ) is used. As the intermediate layer, for example, an oxide of Ce doped with Gd (GDC) is used. As the hydrogen electrode, for example, a mixture of YSZ and $NiO_2$ is used.

Fuel cell 150 further includes a first interconnector 112 having a fuel channel 114 and a second interconnector 122 having an oxidant channel 124. Fuel channel 114 is a channel for supplying fuel (for example, hydrogen) to hydrogen electrode 108. Fuel channel 114 is provided on a major surface of first interconnector 112 that faces current collector 110 for the hydrogen electrode. Oxidant channel 124 is a channel for supplying an oxidant (for example, oxygen) to air electrode 102. Oxidant channel 124 is provided on a major surface of second interconnector 122 that faces current collector 120 for the air electrode.

Figure 12:
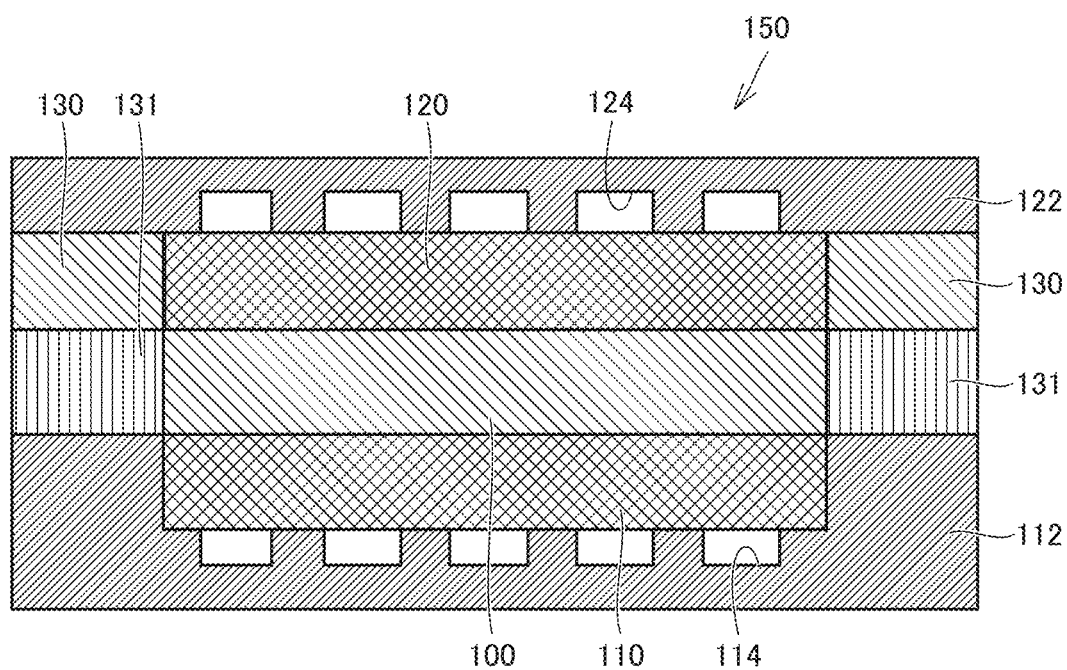
FIG. 12 is a schematic cross section of a fuel cell according to an embodiment of the present disclosure.

Further, fuel cell 150 has a first spacer 130 and a second spacer 131 between first interconnector 112 and second interconnector 122 on side surfaces of current collector 120 for the air electrode and cell 100 for the fuel cell, respectively (FIG. 12). First spacer 130 and second spacer 131 thus disposed prevent the air and the like supplied to oxidant channel 124 from leaking out of fuel cell 150.

Thus the presently disclosed porous body has been described. The presently disclosed porous body thus configured has appropriate strength, appropriate malleability in particular.

Normally, when manufacturing fuel cell 150, initially, each member is stacked to have a prescribed position and thereafter first interconnector 112 and second interconnector 122 are pushed in directions to be opposite to each other to maintain airtightness. In doing so, current collector 120 for the air electrode is prepared to be slightly larger in thickness than first spacer 130 to manufacture fuel cell 150. When first interconnector 112 and second interconnector 122 are pushed in, current collector 120 for the air electrode is collapsed to the thickness of first spacer 130, so that while the airtightness can be maintained, current collector 120 for the air electrode being brought into contact with first interconnector 112 and cell 100 for the fuel cell can be ensured.

Figure 13:
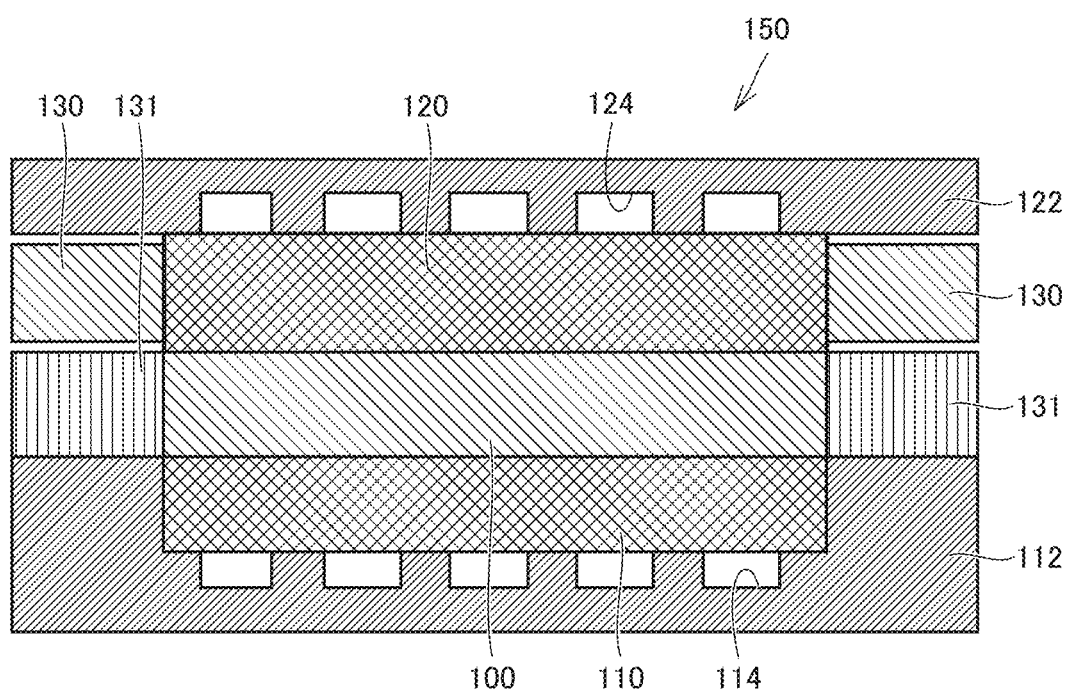
FIG. 13 is a schematic cross section of a fuel cell according to a comparative example of the present disclosure.

In contrast, a conventional porous body is excessively hard, and when this porous body is used as a current collector for an air electrode to manufacture a fuel cell, it has been difficult to collapse and thus deform current collector 120 for the air electrode to the thickness of first spacer 130. Therefore, airtightness between second interconnector 122 and first spacer 130 and airtightness between first spacer 130 and second spacer 131 are not sufficiently ensured, and there is room for improvement (for example, see FIG. 13). The presently disclosed porous body has appropriate malleability, and when the porous body is used as a current collector for an air electrode to manufacture a fuel cell, the porous body is flexibly deformed for example to the thickness of first spacer 130. Therefore, airtightness between second interconnector 122 and first spacer 130 and airtightness between first spacer 130 and second spacer 131 are maintained, and gas such as air does not leak (for example see FIG. 12). As a result, the fuel cell presents excellent output performance.

<<Method for Manufacturing Porous Body>>

A method for manufacturing a porous body according to the present embodiment includes:

forming a conductive coating layer on a resin molded body having a three-dimensional network structure to obtain a conductive resin molded body (a first step);

plating the conductive resin molded body with a nickel-cobalt alloy to obtain a first precursor for the porous body (a second step);

subjecting the first precursor to a heat treatment to incinerate a resin component in the conductive resin molded body and thus remove the resin component to obtain a second precursor for the porous body (a third step); and subjecting the second precursor to a heat treatment in a reducing atmosphere to obtain a porous body (a fourth step). Herein, in the present embodiment, a "nickel-cobalt alloy" means an alloy which includes nickel and cobalt as major components and can include another element (for example, an alloy including nickel and cobalt as major components and including the third component described above).

<First Step>

Initially, a sheet of a resin molded body having a three-dimensional network structure (hereinafter also simply referred to as a "resin molded body") is prepared. Polyurethane resin, melamine resin, or the like can be used as the resin molded body. Furthermore, as a conductiveness imparting treatment for imparting conductiveness to the resin molded body, a conductive coating layer is formed on a surface of the resin molded body. The conductiveness imparting treatment can for example be the following method:

(1) applying a conductive paint containing carbon, conductive ceramic or similarly conductive particles and a binder to the resin molded body, impregnating the resin molded body with the conductive paint, or the like to include the conductive paint in a surface of the resin molded body;

(2) forming a layer of a conductive metal such as nickel and copper on a surface of the resin molded body by electroless plating; and (3) forming a layer of a conductive metal on a surface of the resin molded body by vapor deposition or sputtering. A conductive resin molded body can thus be obtained.

<Second Step>

Subsequently, the conductive resin molded body is plated with a nickel-cobalt alloy to obtain a first precursor for the porous body. While the conductive resin molded body can be plated with a nickel-cobalt alloy by electroless plating, electrolytic plating (so-called alloy electroplating) is preferably used from the viewpoint of efficiency. In nickel-cobalt alloy electroplating, the conductive resin molded body is used as a cathode.

Nickel-cobalt alloy electroplating can be done using a known plating bath. For example, a watt bath, a chloride bath, a sulfamic acid bath, or the like can be used. The electrolytic plating with the nickel-cobalt alloy can be done with a plating bath having a composition for example as follows:

(Bath Composition)

Salt (aqueous solution): Nickel sulfamate and cobalt sulfamate (350 to 450 g/L as the total amount of Ni and Co)

Note that the ratio in mass of Ni and that in mass of Co are adjusted from Co/(Ni+Co)=0.2 to 0.8 by the proportion in mass of Co to the total mass of Ni and Co as desired.

Boric acid: 30-40 g/L pH: 4-4.5.

The electrolytic plating with the nickel-cobalt alloy can be done through electrolysis for example under the following conditions:

(Conditions for Electrolysis)

Temperature: 40-60° C.

Current density: 0.5 to 10 A/dm$^2$

Anode: Insoluble anode.

A first precursor for the porous body with a conductive resin molded body plated with a nickel-cobalt alloy can thus be obtained. In addition, when adding a non-metallic element such as nitrogen, sulfur, fluorine, chlorine, and phosphorus, a variety of types of additives can be introduced into the plating bath to cause the first precursor to contain them. Examples of the variety of types of additives include, but are not limited to, sodium nitrate, sodium sulfate, sodium fluoride, sodium chloride, and sodium phosphate, and it is sufficient that each non-metallic element is included.

<Third Step>

Subsequently, the first precursor is subjected to a heat treatment to incinerate a resin component in the conductive resin molded body and thus remove the resin component to obtain a second precursor for the porous body. The heat treatment for removing the resin component may be done for example at a temperature of 600° C. or higher for a period of time of 1 hour in an atmosphere which is an oxidizing atmosphere such as air.

<Fourth Step>

Finally the second precursor undergoes a heat treatment in a reducing atmosphere to obtain a porous body. Thus a porous body including a framework having a three-dimensional network structure can be obtained. The present inventors consider that the fourth step coarsens the crystal grains included in the framework body and thus achieves a desired effect.

In the fourth step a "reducing atmosphere" is not particularly limited insofar as a reducing gas is present in the atmosphere. The reducing gas includes hydrogen gas, carbon monoxide gas, and hydrogen sulfide gas for example. In the reducing atmosphere, there may be present an inert gas such as nitrogen gas in addition to the reducing gas. The reducing atmosphere includes the reducing gas at a proportion in volume preferably of 50% by volume or more and 100% by volume or less, more preferably 75% by volume or more and 100% by volume or less.

The heat treatment in the fourth step is performed preferably at 650° C. or higher and 1200° C. and lower, more preferably 700° C. or higher and 1200° C. or lower, still more preferably 800° C. or higher and 1100° C. or lower.

The heat treatment in the fourth step is performed preferably for 5 minutes or more and 60 minutes or less, more preferably 10 minutes or more and 20 minutes or less.

Herein, the porous body obtained in the above method has an average pore diameter substantially equal to that of the resin molded body. Accordingly, the average pore diameter of the resin molded body used to obtain the porous body may be selected, as appropriate, depending on the application of the porous body. As the porous body has a porosity ultimately determined by the amount (the apparent weight) of the plating metal, the apparent weight of the plating nickel-cobalt alloy may be selected as appropriate depending on the porosity required for the porous body as a final product. The resin molded body's porosity and average pore diameter are defined in the same manner as the above described framework's porosity and average pore diameter, and can be determined based on the above calculation formula with the term "framework" replaced with the term "resin molded body."

Through the above steps, the porous body according to the present embodiment can be produced. The porous body includes a framework having a three-dimensional network structure, and the framework has a body including crystal grains including nickel and cobalt as constituent elements. Furthermore, the cobalt has a proportion in mass of 0.2 or more and 0.8 or less with respect to the total mass of the nickel and the cobalt. When the porous body has the framework's body observed in cross section at a magnification of 200 times to obtain a first observed image, the crystal grains have a shorter grain diameter of 2 µm or more, as determined in the first observed image. The porous body can thus have appropriate strength as a current collector for an air electrode or a current collector for a hydrogen electrode of a fuel cell.

The above description includes features supplementarily noted below.

(Supplementary Note 1)

A porous body including a framework having a three-dimensional network structure, the framework having a body including crystal grains including nickel and cobalt as constituent elements, the cobalt having a proportion in mass of 0.2 or more and 0.8 or less with respect to a total mass of the nickel and the cobalt, the crystal grains having a shorter grain diameter of 2 µm or more, as determined in a first observed image obtained by observing the body of the framework in cross section at a magnification of 200 times.

(Supplementary Note 2)

The porous body according to Supplementary Note 1, wherein the cobalt has a proportion in mass of 0.2 or more and 0.45 or less or 0.6 or more and 0.8 or less with respect to a total mass of the nickel and the cobalt.

(Supplementary Note 3)

The porous body according to Supplementary Note 1, wherein the crystal grains have a shorter grain diameter of 2 µm or more and 15 µm or less, as determined in the first observed image.

(Supplementary Note 4)

The porous body according to Supplementary Note 1, wherein the crystal grains have a longer grain diameter of 8 µm or more and 20 µm or less, as determined in the first observed image.

(Supplementary Note 5)

The porous body according to Supplementary Note 1, wherein the body of the framework has a thickness of 5 µm or more and 60 µm or less.

(Supplementary Note 6)

The porous body according to Supplementary Note 1, wherein the crystal grains include the nickel and the cobalt at a proportion in mass of 80% by mass or more and less than 100% by mass in total.

EXAMPLES

Hereinafter, the present invention will more specifically be described with reference to examples although the present invention is not limited thereto.

<<Preparing the Porous Body>>

<Sample 1>

A porous body for sample 1 was produced through the following procedure:

(First Step)

Initially, a 1.5 mm thick polyurethane resin sheet was prepared as a resin molded body having a three-dimensional network structure. When this polyurethane resin sheet's porosity and average pore diameter were determined based on the above formula, the porosity was 96% and the average pore diameter was 450 µm.

Subsequently, the resin molded body was impregnated with the conductive paint (slurry including carbon black), and then squeezed with a roll and dried to form a conductive coating layer on a surface of the resin molded body. A conductive resin molded body was thus obtained.

(Second Step)

Using the conductive resin molded body as a cathode, electrolytic plating was performed with a bath composition under conditions for electrolysis, as indicated below. As a result, 660 g/m$^2$ of a nickel-cobalt alloy was deposited on the conductive resin molded body, and a first precursor for the porous body was thus obtained.

<Bath Composition>

Salt (aqueous solution): aqueous solution of nickel sulfamate and cobalt sulfamate The total amount of Ni and Co was 400 g/L.

The proportion in mass of Co/(Ni+Co) was 0.34.

Boric acid: 35 g/L pH: 4.5.

<Conditions for Electrolysis>

Temperature: 50° C.

Current density: 5 A/dm$^2$

Anode: Insoluble anode.

(Third Step)

The first precursor was subjected to a heat treatment to incinerate a resin component in the conductive resin molded body and thus remove the resin component to obtain a second precursor for the porous body. The heat treatment for removing the resin component was done at a temperature of 650° C. in an atmosphere of air. Note that the porous body for sample 1 was produced without performing a heat treatment in a reducing atmosphere (i.e., the fourth step). Thus, the second precursor was provided as the porous body for sample 1.

<Sample 2>

For the first to third steps, the same operation as for <Sample 1> was performed to obtain a second precursor for a porous body.

(Fourth Step)

The second precursor further underwent a heat treatment in a reducing atmosphere (a hydrogen gas atmosphere) to obtain a porous body for sample 2. The heat treatment in the fourth step was performed at a temperature of 650° C. for a period of time of 10 minutes.

<Sample 3>
A porous body for sample 3 was obtained by performing the same operation as for <Sample 2> except that in the fourth step a heat treatment was performed at a temperature of 700° C.

<Sample 4>
A porous body for sample 4 was obtained by performing the same operation as for <Sample 3> except that in the second step 300 g/m² of a nickel-cobalt alloy was deposited on the conductive resin molded body to obtain a first precursor for the porous body.

<Sample 5>
A porous body for sample 5 was obtained by performing the same operation as for <Sample 3> except that in the second step 1300 g/m² of a nickel-cobalt alloy was deposited on the conductive resin molded body to obtain a first precursor for the porous body.

<Sample 6>
A porous body for sample 6 was obtained by performing the same operation as for <Sample 3> except that in the second step 1500 g/m² of a nickel-cobalt alloy was deposited on the conductive resin molded body to obtain a first precursor for the porous body.

<Sample 7>
A porous body for sample 7 was obtained by performing the same operation as for <Sample 2> except that in the fourth step a heat treatment was performed at a temperature of 750° C.

<Sample 8>
A porous body for sample 8 was obtained by performing the same operation as for <Sample 2> except that in the second step 450 g/m² of a nickel-cobalt alloy was deposited on the conductive resin molded body to obtain a first precursor for the porous body and that in the fourth step a heat treatment was performed at a temperature of 800° C.

<Sample 9>
A porous body for sample 9 was obtained by performing the same operation as for <Sample 2> except that in the second step the bath had a composition with Co/(Ni+Co) having a proportion in mass of 0.87, in the second step 420 g/m² of a nickel-cobalt alloy was deposited on the conductive resin molded body to obtain a first precursor for the porous body, and in the fourth step a heat treatment was performed at a temperature of 800° C.

<Sample 10>
A porous body for sample 10 was obtained by performing the same operation as for <Sample 2> except that in the second step the bath had a composition with Co/(Ni+Co) having a proportion in mass of 0.15.

Porous bodies for samples 1-10 were produced through the above procedure. Note that samples 2 to 8 correspond to examples, and samples 1, 9 and 10 correspond to comparative examples.

<<Evaluating Performance of Porous Body>>
<Analyzing Physical Property of Porous Body>
The porous bodies for samples 1 to 10 obtained in the above method were each examined for a proportion in mass of cobalt in the body of the framework of the porous body with respect to a total mass of nickel and cobalt in the body of the framework of the porous body with an EDX device accompanying the SEM (an SEM part: trade name "SUPRA35VP" manufactured by Carl Zeiss Microscopy Co., Ltd., and an EDX part: trade name "octane super" manufactured by AMETEK, Inc.). Specifically, initially, the porous body of each sample was cut. Subsequently, the cut porous body had its framework observed in cross section with the EDX device to detect each element, and the cobalt's proportion in mass is determined based on the element's atomic percentage. As a result, the proportion in mass of cobalt in the framework body of the porous body of each of samples 1 to 10 with respect to the total mass of nickel and cobalt in the framework matched the proportion in mass of cobalt contained in the plating bath used to prepare the porous body with respect to the total mass of nickel and cobalt contained in the plating bath (i.e., a ratio in mass of Co/(Ni+Co)).

Further, the above calculation formula was used to determine the average pore diameter and porosity of the framework of each of the porous bodies of samples 1 to 10. As a result, the average pore diameter and porosity matched the resin molded body's porosity and average pore diameter, and the porosity was 96% and the average pore diameter was 450 μm. Further, the porous bodies of samples 1 to 10 had a thickness of 1.4 mm.

<Calculating Shorter and Longer Grain Diameters>
Initially, the framework body had a cross section subjected to an EBSD analysis in the following procedure: Specifically, a porous body to be measured was cut such that a cross section of the framework body perpendicular to the longitudinal direction of the framework body was obtained at least by one field of view. Thereafter, the obtained cross section was mechanically polished with waterproof abrasive paper (grade: #800 and #2000).

Subsequently, the mechanically polished cross section was further smoothed by ion milling using Ar ions. The ion milling was performed under the following conditions:
Acceleration voltage: 6 kV
Irradiation angle: 0° from a direction of a normal to the cross section of the framework body
Irradiation time: 6 hours
Observed surface: cross-sectional worked surface Subsequently the smoothed cross-section (a mirror surface) was observed with a field emission type scanning FE-SEM (product name: "SUPRA35VP" manufactured by ZEISS) equipped with an EBSD device (trade name: "OIM 7.7.0" manufactured by AMETEK Inc.) at a magnification of 200 times and a thus obtained, first observed image was subjected to an EBSD analysis to create a color map (see FIG. 3 for example). The EBSD analysis was conducted under the following conditions:
Accelerating voltage: 15 kV
Exposure time: 0.01 s
Binning: 8×8
WD: 15 mm
Tilt: 70°
Analysis area: 420 μm×1250 μm Based on the created color map, crystal grains' longer and shorter grain diameters were determined in the above-described method. Six grains' respective shorter grain diameters and respective longer grain diameters were determined per field of view, and their average values were defined as the shorter and longer grain diameters in that field of view. Furthermore, this was done for 10 fields of view, and arithmetic averages of values obtained in the fields of view were defined as the shorter and longer grain diameters of the grains in the porous body. A result is shown in Table 1.

<Thickness of Framework Body>
The thickness of the framework body in each sample was determined by the following procedure: Initially, a porous body as a sample was cut so that a cross section of the framework body was exposed. One cut cross section was selected, and magnified by 3000 times and thus observed with an electron microscope (trade name: Flex SEM1000II, Manufactured by Hitachi High-Tech Corporation) to Obtain an observed image. Subsequently, a thickness of any one side of a triangle forming one framework appearing in the observed image was measured at a center of that one side, and defined as the framework body's thickness. Further, such a measurement was done for 10 observed images (or in 10 fields of view) to obtain the framework body's thickness at 10 points. Finally, the 10 points' average value was calculated to obtain the framework body's thickness. A result is shown in Table 1.

<Evaluation for Power Generation>

Further, the porous bodies of samples 1 to 10 as a current collector for an air electrode, and a YSZ cell manufactured by Elcogen AS (see FIG. 11) were together used to fabricate fuel cells (see FIG. 10), and the fuel cells were evaluated for performance of power generation, as follows:

Output power (or maximum power density) was determined with an operating temperature set to 700° C., and each fabricated fuel cell's current collector for a hydrogen electrode receiving hydrogen as a fuel gas at a flow rate of 0.3 L/min. and the fuel cell's current collector for an air electrode receiving air at a flow rate of 1.0 L/min. A result is shown in Table 1.

TABLE 1

| sample No. | proportion in mass of Co in NiCo | temperature of heat treatment in 4th step (° C.) | crystal grain shorter grain diameter (μm) | crystal grain longer grain diameter (μm) | framework body's thickness (μm) | output performance (mW/cm$^2$) |
|---|---|---|---|---|---|---|
| 1 | 0.34 | — | 1 | 2 | 20 | 250 |
| 2 | 0.34 | 650 | 2 | 5 | 20 | 312 |
| 3 | 0.34 | 700 | 2 | 8 | 20 | 367 |
| 4 | 0.34 | 700 | 2 | 8 | 5 | 343 |
| 5 | 0.34 | 700 | 2 | 8 | 60 | 345 |
| 6 | 0.34 | 700 | 2 | 8 | 75 | 312 |
| 7 | 0.34 | 750 | 4 | 10 | 20 | 375 |
| 8 | 0.34 | 800 | 10 | 20 | 10 | 376 |
| 9 | 0.87 | 800 | 9 | 18 | 9 | 285 |
| 10 | 0.15 | 650 | 2 | 5 | 20 | 240 |

<Discussion>

According to a result of the examples shown in Table 1, it has been found that when a porous body comprising a framework having a body including nickel and cobalt at a prescribed proportion and including crystal grains having a shorter grain diameter of 2 μm or more is used as a current collector for an air electrode to manufacture a fuel cell, the fuel cell has power to output 300 mW/cm$^2$ or more and thus presents satisfactory performance.

Thus it has been found that the porous bodies according to the examples had appropriate strength as a current collector for an air electrode and a current collector for a hydrogen electrode of a fuel cell.

According to a result of the comparative example shown in Table 1, when a porous body comprising a framework having a body including nickel and cobalt at a prescribed proportion and including crystal grains having a shorter grain diameter of less than 2 μm was used as a current collector for an air electrode to manufacture a fuel cell, the fuel cell had power to output 250 mW/cm$^2$ and was thus below the fuel cells of the examples in performance. It was believed that such a porous body was excessively hard, and when it was used to manufacture a fuel cell, it did not ensure sufficient airtightness between spacers (for example see FIG. 13), and air and the like leaked. Further, when a porous body comprising a framework having a body containing cobalt at a proportion exceeding a prescribed proportion was used as a current collector for an air electrode to manufacture a fuel cell, the fuel cell had power to output 285 mW/cm$^2$ and was thus below the fuel cells of the examples in performance (see sample 9). It was believed that such a porous body was also excessively hard, and when it was used to manufacture a fuel cell, it did not ensure sufficient airtightness between spacers and air and the like leaked.

When a porous body comprising a framework having a body containing cobalt at a proportion less than the prescribed proportion was used as a current collector for an air electrode to manufacture a fuel cell, the fuel cell had power to output 240 mW/cm$^2$ and was thus below the fuel cells of the examples in performance (see sample 10). It was believed that such a porous body had insufficient hardness and when it was used to manufacture a fuel cell, the porous body cracked.

Although embodiments and examples of the present invention have been described as described above, it has also been planned from the beginning to appropriately combine the configurations of the above-described embodiments and examples.

The embodiments and examples disclosed herein are illustrative in all respects and should not be construed as being restrictive. The scope of the present invention is shown not by the above-described embodiments and examples but by the claims, and is intended to include all modifications within the scope and meaning equivalent to the claims.

REFERENCE SIGNS LIST 1 rib, 2 node, 10 frame, 11 framework body, 12 framework, 13 inner portion, 14 pore, 20 cell, 30 three-dimensional network structure, 100 cell for fuel cell, 102 air electrode, 104 intermediate layer, 106 electrolyte layer, 108 hydrogen electrode, 110 current collector for hydrogen electrode, 112 first interconnector, 114 fuel channel, 120 current collector for air electrode, 122 second interconnector, 124 oxidant channel, 130 first spacer, 131 second spacer, 150 fuel cell, A virtual plane, R1 shorter grain diameter, R2 longer grain diameter

The invention claimed is:

1. A porous body comprising a framework having a three-dimensional network structure,
the framework having a body including crystal grains including nickel and cobalt as constituent elements, the cobalt having a proportion in mass of 0.2 or more and 0.8 or less with respect to a total mass of the nickel and the cobalt, the crystal grains having a shorter grain diameter of 2 µm or more, as determined in a first observed image obtained by observing the body of the framework in cross section at a magnification of 200 times, wherein when the body of the framework is observed in cross section at a magnification of 3,000 times to obtain a second observed image, the second observed image presents in any area 10 µm square thereof five or less voids each having a longer diameter of 1 µm or more.

2. The porous body according to claim 1, wherein the crystal grains have a longer grain diameter of 8 µm or more, as determined in the first observed image.

3. The porous body according to claim 1, wherein the body of the framework has a thickness of 5 µm or more and 75 µm or less.

4. The porous body according to claim 1, wherein the body of the framework further includes as a constituent element at least one element selected from the group consisting of silicon, calcium, potassium, magnesium, carbon, tin, aluminum, sodium, iron, tungsten, titanium, phosphorus, boron, silver, gold, copper, zinc, chromium, molybdenum, nitrogen, sulfur, fluorine and chlorine.

5. The porous body according to claim 1, wherein the body of the framework further includes oxygen as a constituent element.

6. The porous body according to claim 5, wherein the body of the framework includes the oxygen in an amount of 0.1% by mass or more and 35% by mass or less.

7. The porous body according to claim 5, wherein the body of the framework includes a spinel-type oxide.

8. The porous body according to claim 1, wherein the framework is hollow.

9. The porous body according to claim 1, wherein the porous body has a sheet-shaped external appearance and has a thickness of 0.2 mm or more and 2 mm or less.

10. A fuel cell comprising a current collector for an air electrode and a current collector for a hydrogen electrode, at least one selected from the group consisting of the current collector for the air electrode and the current collector for the hydrogen electrode including the porous body according to claim 1.

11. The porous body according to claim 9, wherein the thickness is 0.5 mm or more and 1 mm or less.

12. The porous body according to claim 1, wherein the framework has a total apparent weight of 200 $g/m^2$ or more and 1,000 $g/m^2$ or less.

13. The porous body according to claim 1, wherein the framework has an apparent density preferably of 0.14 $g/cm^3$ or more and 0.75 $g/cm^3$ or less.

14. The porous body according to claim 1, wherein the framework has a porosity preferably of 40% or more and 98% or less.

15. The porous body according to claim 1, wherein the framework has an average pore diameter of 60 µm or more and 3,500 µm or less.

* * * * *